J. G. VINCENT.
PISTON.
APPLICATION FILED OCT. 22, 1913.

1,279,184.

Patented Sept. 17, 1918.
2 SHEETS—SHEET 1.

Witnesses:
Clair J. Cote,
Le Roi J. Williams.

Inventor:
Jesse G. Vincent,
By Milton Tibbetts,
Attorney.

J. G. VINCENT.
PISTON.
APPLICATION FILED OCT. 22, 1913.

1,279,184.

Patented Sept. 17, 1918.
2 SHEETS—SHEET 2.

Witnesses:
Blair J. Cote,
Le Roi J. Williams.

Inventor:
Jesse G. Vincent,
By Milton Tibbetts,
Attorney

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

PISTON.

1,279,184.  Specification of Letters Patent.  Patented Sept. 17, 1918.

Application filed October 22, 1913. Serial No. 796,647.

*To all whom it may concern:*

Be it known that I, JESSE G. VINCENT, a citizen of the United States, and resident of Detroit, Wayne county, State of Michigan, have invented certain new and useful Improvements in Pistons, of which the following is a specification.

This invention relates to pistons and particularly to pistons for hydrocarbon motors. One of the essentials of a good hydrocarbon motor such as may be used for motor vehicles is that the fit between the piston and the cylinder wall shall be loose enough so that the piston will be free to operate when the motor is hot and yet shall be tight enough to minimize leakage and to prevent what is technically known as "piston slap," that is, the sudden movement of the piston from one side of the cylinder to the other, usually at or during the explosion stroke.

This desired fit is of course difficult to get, and because of the fact that the top of the piston is subject to greater heat than the bottom of it, the piston is often ground to a tapered form, that is, with a greater clearance at the top of the piston than at the bottom. Under these circumstances the heat will expand the upper part or head of the piston more rapidly than the lower part or skirt, and when the motor is hot the piston is substantially cylindrical in shape, thus making the clearance throughout the length of the piston about the same.

It will be seen, therefore, that it is desirable that the piston should be kept in fairly close contact with the wall of the cylinder throughout the length of the piston or so much of its length as is possible.

One of the objects of the present invention is to form a piston with a yieldingly expanded skirt portion.

Another object of the invention is to form a piston with a solid cylindrical head portion and a yieldingly expanded skirt portion.

Another object of the invention is to form a piston in which the skirt portion is capable of contracting under pressure.

Another object of the invention is to form a piston with a cylindrical head and with a skirt portion formed of a plurality of segmental parts.

Other objects of the invention will appear from the following description taken in connection with the drawings which form a part of this specification, and in which:—

Figure 1:
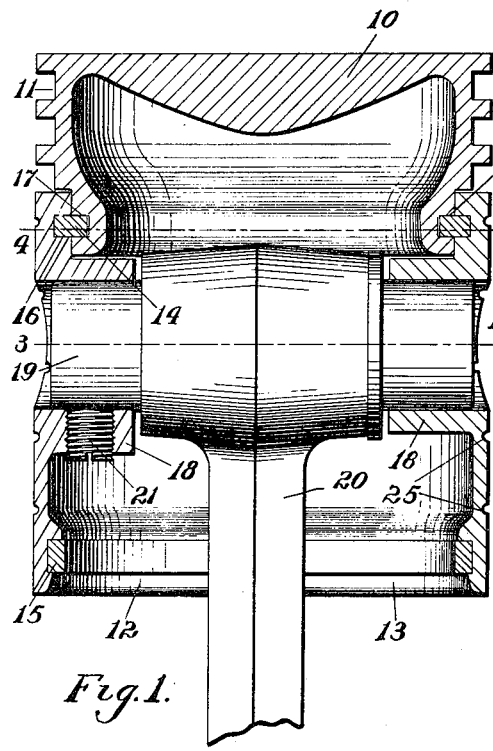
Figure 1 is a longitudinal section through a piston made in accordance with this invention.
Figure 2:
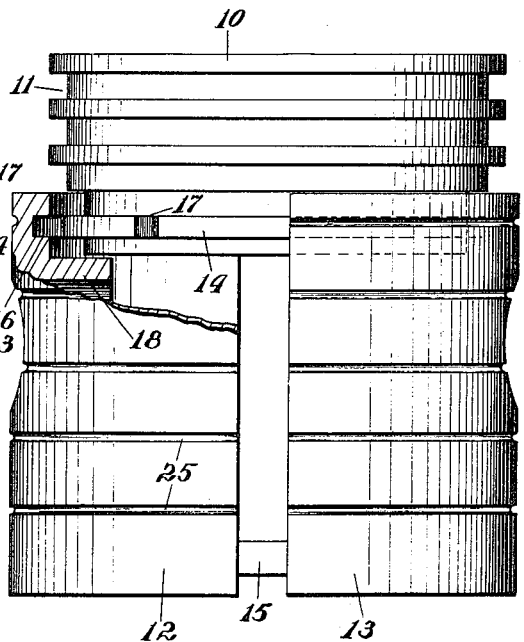
Fig. 2 is an elevation view of the piston shown in Fig. 1 with the parts separated somewhat and with some of them cut away.
Figure 3:
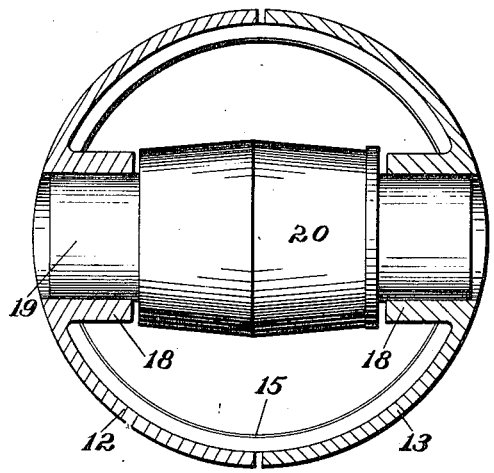
Fig. 3 is a transverse section on the line 3—3 of Fig. 1.
Figure 4:
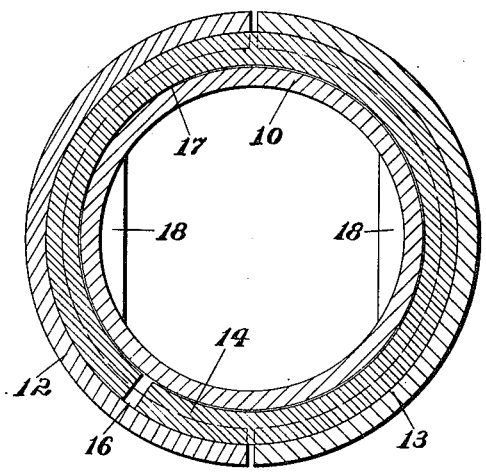
Fig. 4 is a transverse section on the line 4—4 of Fig. 1.

Referring to the form of the invention shown in Figs. 1 to 4, the upper portion or head of the piston is indicated at 10 and it is shown as of cylindrical form and made in one piece. Suitable grooves 11 are cut in the circumferential part of this head portion to take the usual piston rings. The skirts of the piston are shown as in two semi-cylindrical parts 12 and 13 and these parts are adapted to be expanded against the cylinder wall by means of two expanding rings 14 and 15 at the upper and lower ends of the parts respectively, as shown in the drawings. The upper expanding ring 14 has a further function in that it joins the upper part of the piston to the lower or segmental parts. This is accomplished by fitting the ring 14 into two alined annular grooves 16 and 17 in the skirt and head portions respectively of the piston.

The bosses 18 are shown as formed in the skirt portion of the piston for the reception of the piston pin 19 upon which is the connecting rod 20. A suitable screw 21 secures the piston pin in position.

Figure 5:
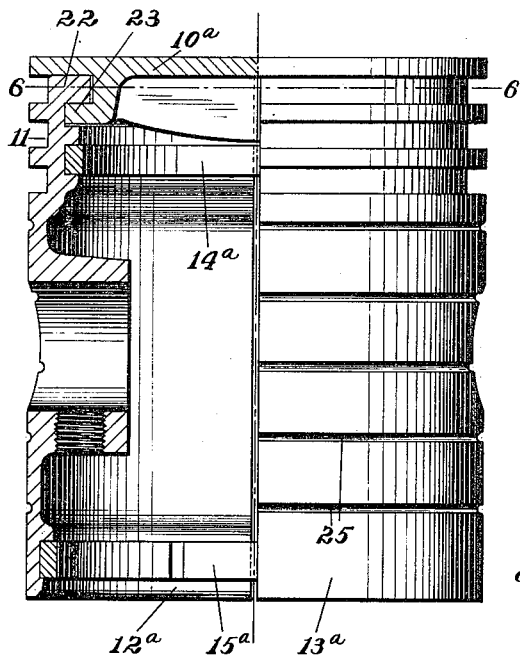
Fig. 5 is a part elevation of another form of piston made in accordance with this invention.
Figure 6:
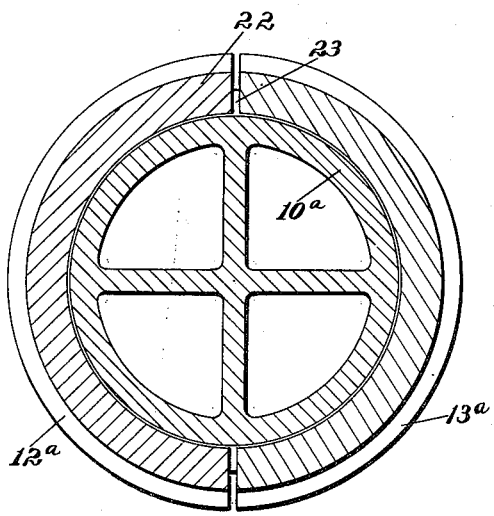
Fig. 6 is a section on the line 6—6 of Fig. 5.

In the form of the invention shown in Figs. 5 and 6, the head portion 10ª of the piston is shorter and the two part skirt portion 12ª and 13ª, is provided with the piston ring grooves 11 as shown in the drawings. In this form also the head and skirt portions of the piston are interlocked by means of annular flanges 22 and 23, the piston of course being assembled before it is placed in the cylinder. Expanding rings 14$^a$ and 15$^a$ are provided as in the previous form of the invention.

Figure 7:
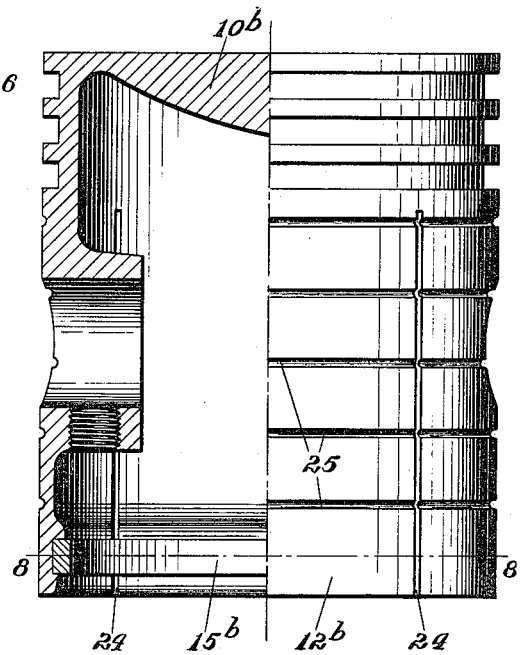
Fig. 7 is a view similar to Fig. 5 of another form of the invention.
Figure 8:
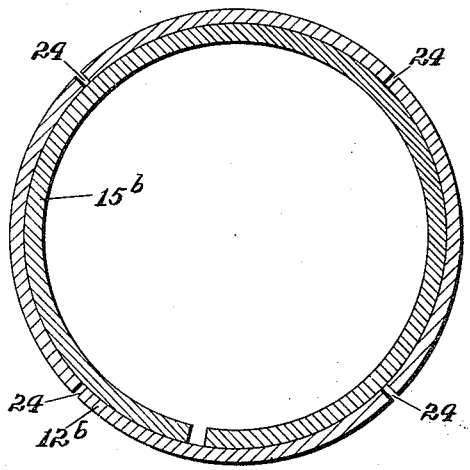
Fig. 8 is a section on the line 8—8 of Fig. 7.

In the form shown in Figs. 7 and 8, the skirt portion of the piston is divided into four segments by means of sawing longitudinal grooves 24 therein. This leaves the skirt portion 12$^b$ of the piston integral with the head portion 10$^b$ and in the form of dependent segments, the lower parts of which segments may be expanded against the cylinder wall as by the expanding ring 15$^b$. In this form only one expanding ring is used, but two or more may be used as in the other form. The skirts of all of the pistons shown are provided with annular grooves 25 to facilitate lubrication of the piston.

It is understood that the invention is not limited to the exact details of construction shown in these various views, as it will be apparent that changes may be made and other forms employed without departing from the spirit or scope of the invention.

Having thus described my invention, what I claim and desire to secure by Letters Patent is:—

1. A piston having a yieldingly expanding skirt portion and piston pin lugs formed wholly in said skirt portion.

2. A piston comprising a head portion and segmental parts forming the skirt portion, and means for yieldingly pressing said segmental parts radially outward, the piston pin lugs of the piston being formed wholly in said skirt portion.

3. A piston comprising an integral cylindrical head portion, a pair of semi-cylindrical parts forming the skirt portion, and separately formed annular means for connecting said portions.

4. A piston comprising an integral cylindrical head portion, a pair of semi-cylindrical parts forming the skirt portion, and separately formed circumferential interlocking connecting means for said portions.

5. A piston comprising an integral cylindrical head portion, a pair of semi-cylindrical parts forming the skirt portion, separately formed interlocking connecting means for said portions, and means for yieldingly expanding said semi-cylindrical parts.

6. A piston comprising a cylindrical head portion adapted to contact with a cylinder wall, a pair of semi-cylindrical parts forming the skirt portion, and an interlocking connecting ring for said portions.

7. A piston comprising a head portion, a separately formed skirt portion, and an interlocking connecting ring for said portions.

8. A piston comprising a head portion, segmental parts forming the skirt portion, and means acting to connect said portions and to press said segmental parts radially outward.

9. A piston comprising a head portion, segmental parts forming the skirt portion, and means acting to connect said portions and to yieldingly press said segmental parts radially outward.

In testimony whereof I affix my signature in the presence of two witnesses.

JESSE G. VINCENT.

Witnesses:
LE ROI J. WILLIAMS,
CLAIR J. COTE.